(12) United States Patent
Kydd

(10) Patent No.: US 9,566,867 B2
(45) Date of Patent: Feb. 14, 2017

(54) VEHICLE-SOLAR-GRID INTEGRATION

(71) Applicant: Paul Harriman Kydd, Lawrenceville, NJ (US)

(72) Inventor: Paul Harriman Kydd, Lawrenceville, NJ (US)

( * ) Notice: Subject to any disclaimer, the term of this patent is extended or adjusted under 35 U.S.C. 154(b) by 458 days.

(21) Appl. No.: 14/101,423

(22) Filed: Dec. 10, 2013

(65) Prior Publication Data

US 2015/0162784 A1   Jun. 11, 2015

(51) Int. Cl.
| | |
|---|---|
| *B60L 11/18* | (2006.01) |
| *H02J 3/32* | (2006.01) |
| *H02J 7/35* | (2006.01) |
| *H02J 13/00* | (2006.01) |
| *H02J 7/00* | (2006.01) |

(52) U.S. Cl.
CPC .............. *B60L 11/1811* (2013.01); *H02J 3/32* (2013.01); *H02J 7/35* (2013.01); *H02J 13/0006* (2013.01); *B60L 2210/10* (2013.01); *B60L 2210/30* (2013.01); *B60L 2210/42* (2013.01); *Y02E 10/566* (2013.01); *Y02E 60/721* (2013.01); *Y02E 70/30* (2013.01); *Y04S 10/126* (2013.01)

(58) Field of Classification Search
CPC ........................................................ H02J 7/00
USPC ........................................................ 307/9.1
See application file for complete search history.

(56) References Cited

U.S. PATENT DOCUMENTS

| | | | | |
|---|---|---|---|---|
| 7,747,739 B2* | 6/2010 | Bridges | ..................... | B60L 3/12 307/80 |
| 2010/0193261 A1* | 8/2010 | Freeman | ................ | B60K 16/00 180/2.2 |
| 2012/0249065 A1* | 10/2012 | Bissonette | ............ | B60L 11/184 320/109 |
| 2013/0113413 A1* | 5/2013 | Harty | .................. | H01M 10/465 320/101 |

* cited by examiner

*Primary Examiner* — Robert Deberadinis

(57) ABSTRACT

This invention comprises a method and apparatus to integrate underutilized Electric Vehicle battery packs with similarly underutilized solar PhotoVoltaic grid-tied inverters via an EVPV apparatus to provide ancillary services to the electric grid at night when the vehicles are parked and the sun is not shining.

18 Claims, 6 Drawing Sheets

To / From Grid

VEHICLE-SOLAR-GRID INTEGRATION

FEDERALLY SPONSORED RESEARCH

None prior to filing provisional application 61/735,267 referred to above. This concept has been developed into useable hardware under NSF Grant no IIP-1314675

CROSS-REFERENCE TO RELATED APPLICATIONS

This application claims the priority of Provisional Patent Application 61/735,267 filed Dec. 12, 2012, by the present inventor and incorporated herein by reference.

REFERENCES CITED

U.S. Patent Documents

| | | |
|---|---|---|
| 8,509,976 | August 2013 | Kempton |
| 8,463,449 | June, 2013 | Sanders |
| 8,278,881 | October, 2012 | Woody |
| 7,582,979 | September, 2009 | Oyobe |
| 2011/0202418 | | Kempton |
| 2011/0202217 | | Kempton |
| 2011/0202192 | | Kempton |

Other References

V2G-101, Beck, L. J., January, 2009

BACKGROUND OF THE INVENTION

This invention is broadly applicable to linking a large battery pack, as in an Electric Vehicle (EV), with an existing grid-tied inverter, as in a PhotoVoltaic (PV) solar system, to provide bidirectional ancillary services such as frequency regulation to an electric utility grid operator. The resulting service revenue can provide an incentive for EV and solar PV ownership. Management of one-way power flow to electric vehicles has been described as in U.S. Pat. No. 8,278,881, Woody (assigned to GM) and from electric vehicles for emergency power as in U.S. Pat. No. 7,582,979, Oyobe (assigned to Toyota). The objective here is bidirectional power flow, both in and out, under remote control.

Electric vehicles, because of their large and expensive battery packs are more expensive than equivalent Internal Combustion (IC) powered vehicles. At the same time these expensive vehicles are typically parked overnight and not used. Similarly, PV systems with expensive grid-tied inverters which convert Direct Current (DC) power from the PV panels to Alternating Current (AC) power and provide it to local loads and the grid are idle after sundown at night. This invention has as its objective to enable both of these underutilized assets to be linked and used to perform useful ancillary services to the grid and to generate revenue from the electric grid Independent System Operator (ISO) as described by Beck (2009). It is a further object of this invention to provide a method which is broadly applicable to virtually any electric vehicle and any type of grid-tied inverter. This method and the associated Electric Vehicle-PhotoVoltaic (EVPV) linking apparatus are unlike the Electric Vehicle Equipment for Grid-Integrated Vehicles described in U.S. Pat. No. 8,509,976, Kempton (2013). Kempton's patent and related patent applications rely on a specialized Electric Vehicle Equipment (EVE) on board the vehicle to communicate with the stationary Electric Vehicle Service Equipment (EVSE) which charges the vehicle battery pack and links the vehicle to the grid for ancillary service revenue. Kempton further relies on power electronic equipment onboard the vehicle to perform the high current charging and DC-AC inversion required for frequency regulation. The present invention relies on an off-board EVPV and an existing off-board inverter for both of these functions.

The SEGIS-ES equipment described in detail in U.S. Pat. No. 8,463,449, Sanders, (2013), which is an outcome of a similarly titled research program at Sandia National Laboratory, is similar in concept to the present invention. Bidirectional chargers are available form Princeton Power Systems and Dynapower. The unique feature of the present invention is the linkage of virtually any existing battery pack as in Electric Vehicles and virtually any existing grid-tied inverters as in solar PhotoVoltaic systems to achieve a minimum-cost electric storage capability to support the grid and earn revenue as an incentive for EV and PV ownership.

It is not possible to link the battery pack directly to the inverter because PV inverters typically use Maximum Power Point Tracking (MPPT) technology to optimize the power drawn from the solar PV array as the solar irradiance fluctuates during the day. A PV array is limited in both voltage and current and MPPT technology varies the impedance of the inverter searching for the "knee" of the current-voltage curve where the PV power output is maximized. A battery pack has a limited voltage but almost unlimited current capability, and an MPPT inverter will increase power without limit until something fails. Furthermore, ancillary service requests are proportional, not on-off, so a means of controlling the power output of the battery pack is required. A DC-DC converter can perform both current limiting and power control functions.

To obtain revenue from the ISO it is necessary to provide power flow in either direction on request, and this can be accommodated by provision of a battery charger with an equivalent output to the inverter and the DC-DC converter. In principle this charger could also charge the battery, but there are practical considerations that rule against this. Most EVs have on-board chargers which are specifically designed and controlled to charge their batteries safely. Since one of the objectives of this invention is to obtain ancillary service revenue for any vehicle with a DC quick charge port without modification of the vehicle or tampering with its onboard systems, an independent off-board charger is indicated.

Another reason for having matched DC-DC converters and off board chargers is that the vehicle battery can deliver more power than is normally used in charging it, and ancillary services are reimbursed on the basis of symmetric power available for both up and down regulation. Typically vehicles are charged at either the J1772 level 1 rate from a 120 V AC source at 15 A or 1.9 kW or the level 2 rate from a 240 V AC source at 24 or 40 Amps (5.8 or 9.6 kW). However a 24 kWh battery as in the popular Nissan Leaf battery electric vehicle can deliver power at 24 kW the 1.0 C rate (complete discharge in one hour) or even more, and get paid for it at that rate, provided that the charge rate is the same. Traction batteries in the mid range of their state of charge are designed for heavy drains for acceleration and heavy charging currents for regenerative braking.

Fortunately, modern battery chargers which are switching power supplies can also double as DC-DC converters, so that the same type of equipment can provide both services.

The inverter must be capable of providing power to the grid (a so-called grid-tied inverter) as used in most solar PV installations. The incentive for this is that the grid can provide power to the user at night when the sun isn't shining and the PV array can feed excess power to the grid during the day. The utility and economics of solar PV depend on this interchange of energy, since a stand alone PV system with enough battery storage to cover local loads over an extensive period of bad weather in the winter would be exorbitantly expensive. Most solar PV installations benefit from an agreement with their local utility known as net metering in which a bidirectional electric meter measures the power flow in and out, but the customer is billed only for the net input. This clearly is critical for ancillary service revenue, because if the customer is charged for the power input but not credited with the reverse flow, the energy bill far outweighs the ancillary service power revenue.

Grid-tied inverters have extensive electronic controls to synchronize their output with the grid. They also have so-called anti-islanding features, so that if there is a power outage, the solar PV power is turned off to prevent it from being fed back into the part of the grid that is still connected to the solar location and posing a hazard to the linemen sent to fix the outage. This loss of solar power just when it would be most useful is an aggravating feature of existing PV systems. In principle this invention can alleviate this problem by providing power through the inverter even at night during an outage by disconnecting the solar system from the grid and spoofing the inverter to start up again. A safer alternative is to provide a separate inverter serving only local loads and switching the DC connection to it during outages. A less costly alternative is posed by some of the newer inverters which have an internally switched receptacle that can be powered by the solar PV array for limited amounts of emergency power during an outage. Here the back up feature of this invention to keep the emergency power flowing at night or in bad weather from the EV battery pack could be very valuable.

Inverters are relatively short-lived relative to PV arrays and the balance of the PV system. In some cases it will pay to anticipate replacement and install a larger inverter to accommodate the high power capability of this invention to earn more service revenue from a higher power capability of the whole system and to get the emergency power feature mentioned above.

The primary reason that inverters fail is that the inlet filter capacitors experience too much voltage variation due to a significant 60 Hz AC ripple on the DC output of the PV array due to the AC load imposed by the inverter. A necessary feature of this invention is a very large input capacitor to the inverter which will minimize this AC ripple and should increase the life of the inverter.

BRIEF SUMMARY OF THE INVENTION

This invention comprises the method of interfacing a large battery pack, as in an electric vehicle, with a grid-tied inverter, as in a photovoltaic system to provide ancillary services to the electric utility grid, the software to control the interface and the apparatus to accomplish the integration. The apparatus is an Electric Vehicle Photo Voltaic (EVPV) integrator comprising an off-board battery charger and a DC-DC converter of substantially equal capacity, with switching and control equipment to interface with the electric utility grid ISO, and appropriate cords and connectors to interface with the vehicle or other battery pack. The EVPV also comprises equipment to charge the battery pack from the AC grid supply. The charging power may be controlled by a switch to charge only during times when the cost of power is particularly favorable, or to avoid times of excessive cost, so-called Time of Use (TOU) charging.

The method involves connecting the vehicle or the battery pack to the EVPV, which then verifies the state of charge of the battery pack and charges it to approximately half of its capacity, if necessary. When the PV output drops to some preset value at which the value of regulation service is greater than the value of the electric energy produced by the PV array, the array is switched off and power can flow from the battery pack through the DC-DC converter to the inverter. When the ISO requests power to support the grid (up regulation), an up regulation signal causes the DC-DC converter to supply the requested fraction of its capacity. When the ISO requests the system to accept excess power from the grid (down regulation), a down regulation signal causes the off-board charger to send the requested fraction of its capacity to the battery pack. The up and down regulation signals are supposed to be balanced so that the batteries supplying power to the grid are never driven to full charge or exhaustion. Typically a regulation interlude lasts five to ten minutes and averages half power, so a typical excursion amounts to five percent of the EVPV capacity, e.g. 500 Watt hours for a 10 kW system. This should be less than five or ten percent of the battery pack capacity to avoid excessive cycling, and the danger of driving the pack to one extreme or the other, e.g. at least 5 kWh of storage and preferably 10 kWh for a 10 kW EVPV.

BRIEF DESCRIPTION OF THE DRAWINGS

The means by which these objectives are achieved by the present invention are illustrated in the accompanying drawings.

DETAILED DESCRIPTION OF THE INVENTION THE PREFERRED EMBODIMENT

Figure 1:
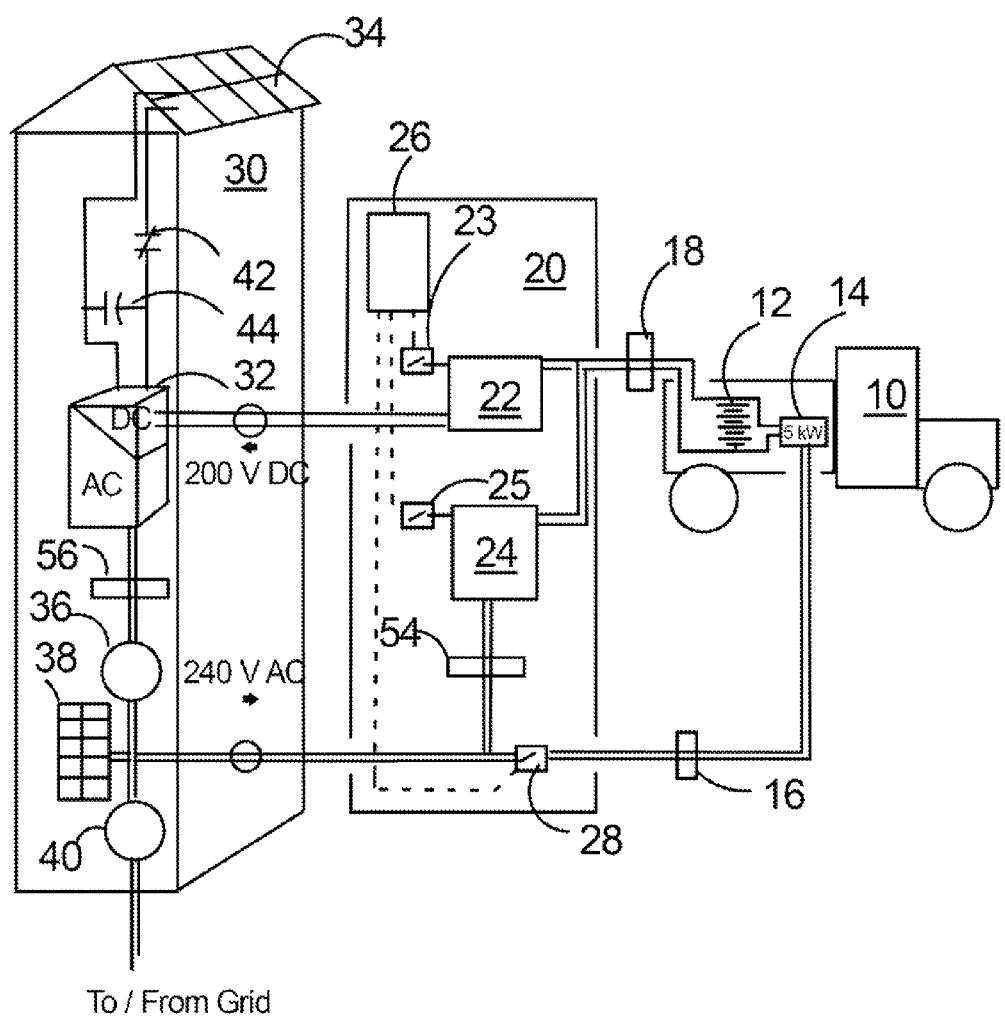
FIG. 1 is a schematic drawing of the apparatus of this invention in a typical installation illustrating the method of operation.

In FIG. 1 electric vehicle 10 is shown connected electrically to EVPV of this invention 20 which interfaces with solar PV installation in building 30. Vehicle 10 comprises battery pack 12 which is charged by on-board charger 14. Charger 14 is supplied with AC power from EVPV 20 through connection 16 which may be the standard SAE J31772 level 1 or level 2 plug and receptacle. The EVPV is connected direct to the battery pack 12 through DC connection 18, which may be any of the standard DC quick charge standards such a the Japanese standard CHAdeMO connector or the J1772 level 1 or 2 DC connector or a simple Anderson connector rated at 50 amps or more.

EVPV 20 comprises two major components, a DC-DC converter 22 and an off-board battery charger 24 of substantially equal capacity. These components are controlled by up regulation control means 23 and down regulation control means 25. These regulation control means are in turn interfaced to the grid ISO regulation requests via Data Acquisition and Control System (DACS) 26. DACS 26 may also control switch 28 to permit charging the battery pack only at times of favorable electricity prices to achieve TOU charging.

The EVPV 20 in turn is connected to the PV installation by permanent AC and DC wiring. The DC-DC converter in addition to exercising current limiting and control functions also matches the battery pack voltage to the needs of the inverter. Typically vehicle battery packs are at a nominal voltage of 120 to 400 VDC. Typical solar installations operate at 320 to 600 V, and even higher. The DC-DC converter needs to raise the battery pack voltage to the minimum which the inverter 32 needs to function properly.

The inverter 32 is normally supplied with DC power from PV array 34. The inverter converts the DC to AC power at 60 Hz and feeds it through a solar power meter 36 to the local load distribution panel 38. Any excess power is exported to the grid via net meter 40. Electric service is billed on the net kilowatt hours of power imported.

Two additional features are required in the PV installation to achieve the objects of this invention. Contactor 42 isolates PV array 34 from inverter 32 when PV power is insufficient and the system is switched over to battery operation. This contactor is necessary to prevent power from converter 22 flowing back into PV array 34.

Capacitor 44 is required to provide DC-DC converter 22 with a load when it starts up. Typically capacitor 44 is 10,000 microfarads rated at 450V. A subsidiary benefit of capacitor 44 is to reduce the stress on the inlet capacitors of inverter 32 with an expected increase in life of the inverter.

Figure 2:
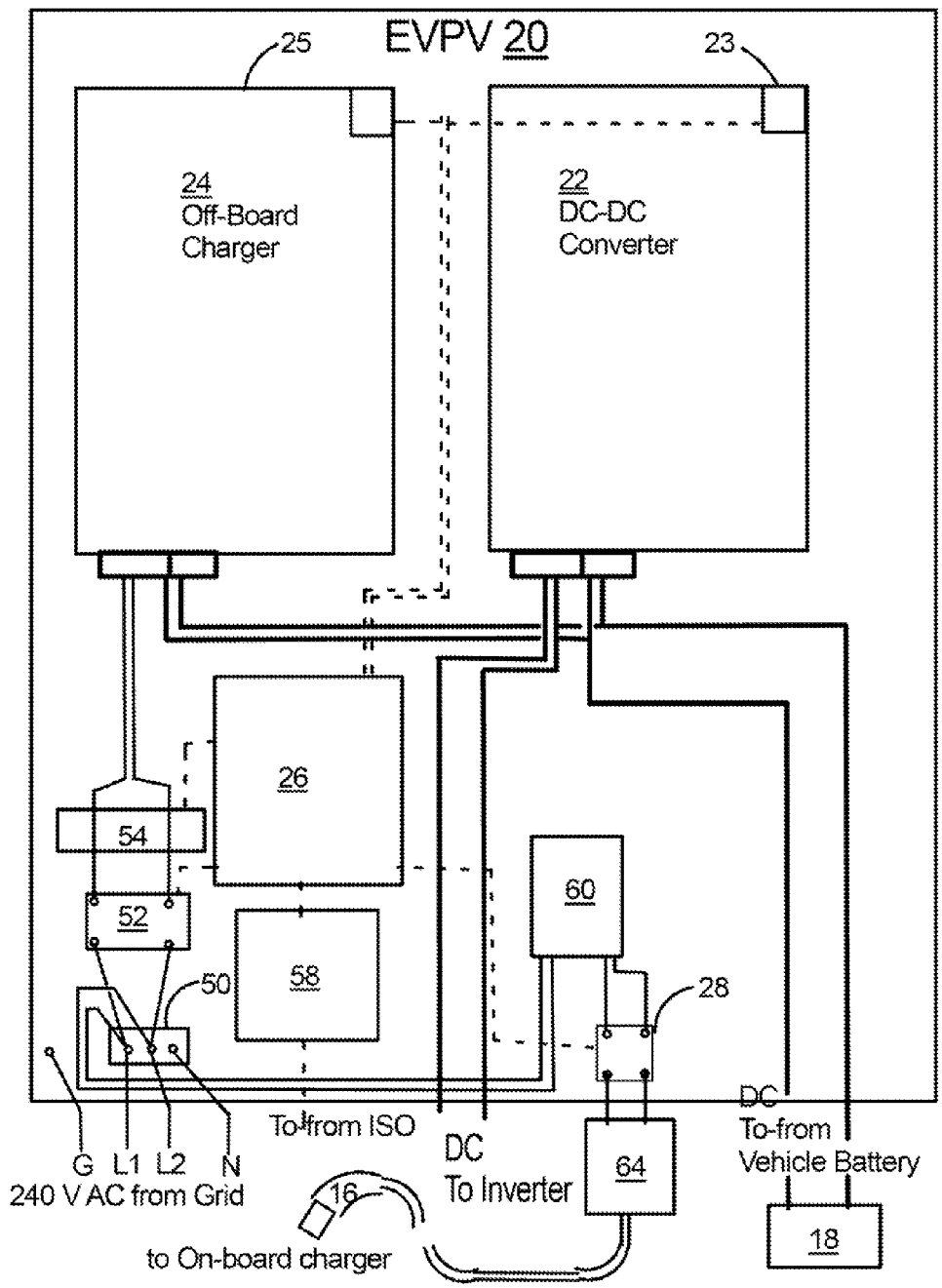
FIG. 2 is a schematic drawing of the major components of the EVPV of this invention illustrating their individual functions.

FIG. 2 Shows more details of EVPV 20, which is a specific apparatus embodying this invention. AC power from the grid enters at junction block 50 comprising Line 1 and Line 2 at 120V, 60 HZ relative to Neutral (240V relative to each other), with Neutral and Ground at (0V).

AC power from L1 and L2 flows through switch 52 (which may be a DPST switch or one SPST switch on each phase) and current transformer 54 (on one phase or on both phases) to off-board charger 24 under control of DACS unit 26 through switch means and current control means 25, which may be internal to charger 24. The DC power from charger 24 flows through DC connector 18 and on to battery pack 12 of FIG. 1. Off-board charger 24 is adjusted to provide the proper voltage to the battery pack. DACS 26 monitors the power flowing to charger 24 by measuring voltage at block 50 and current through current transformer 54 for confirmation to the ISO that their requests are being honored.

DC power can flow back from battery pack 12 through connector 18 through DC-DC converter 22 to inverter 32. Converter 22 is adjusted to provide the proper voltage to inverter 32, and the current is controlled by DACS 26 through switch means and current control means 23, which may be internal to converter 22. AC power from inverter 32 is monitored by DACS 26 by measuring voltage at block 50 and current by current transformer 56 on one or both phases of the output of inverter 32 in FIG. 1.

DACS 26 interfaces via communications means 58 with the ISO to receive requests for up or down regulation, which it satisfies by sending instructions to DC-DC converter 22 and off-board Charger 24. DACS 26 measures the response of the system through current transformers 54 and 56 and returns the data to the ISO to qualify for payments via communication means 58.

240 V battery pack charging current flows from bock 50 through ground fault detecting circuit breaker 60 through switch 28 to optional J1772 level 2-compliant charging equipment 64 that comprises the 12 V square wave generator, controller and contactor that are necessary for the J1772 charging protocol. Charging power is connected to the vehicle via J1772-compliant plug 16.

Figure 3:
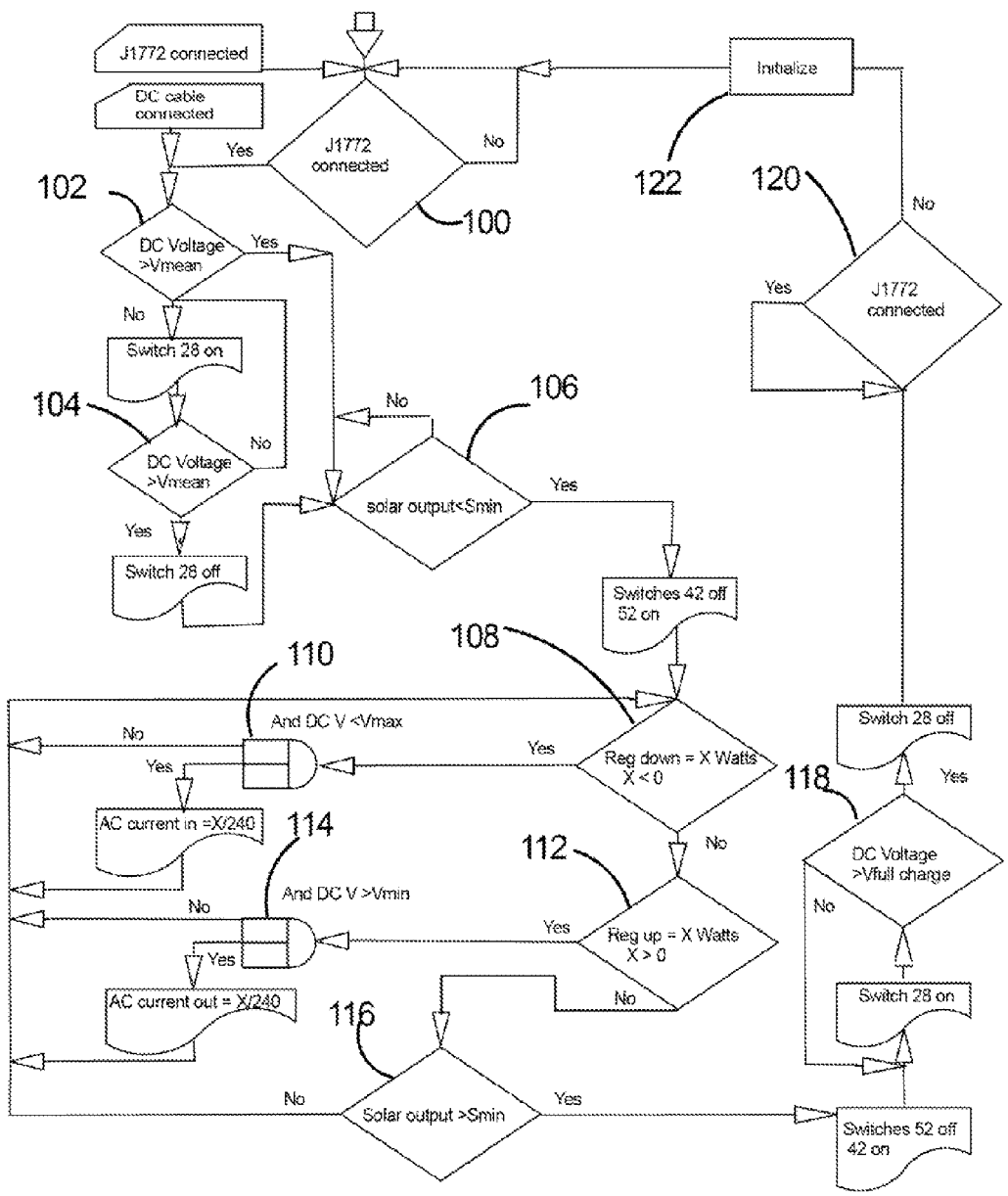
FIG. 3 is a logic diagram illustrating the method of this invention.

FIG. 3 is a logic diagram for DACS 26 embodying the method of this invention. 240V AC power is available at all times, and the DACS, which is powered by 12V derived from the 240V supply, is always seeking connection with vehicle 10 of FIG. 1 by looping in step 100 of FIG. 3.

When the AC Charging connection is made through plug 16 of FIG. 1 the DACS senses the connection via the connection or control contacts of plug 16 in step 100 and proceeds to step 102.

In step 102 DACS 26 measures the DC voltage of Pack 12 of FIG. 1. If this voltage is below midrange for the battery pack, designated by Vmean, step 102 directs switch 28 in FIG. 1 to close starting to charge battery pack 12 and raising the voltage measured at step 104. The DACS continues to loop through steps 102 and 104 until the pack voltage reaches the midrange value Vmean, which is most suitable for frequency regulation service, giving the widest margin for charging and discharging battery pack 12, and imposing the least stress on the pack by operating as far as possible from the extremes in its state of charge.

When Vmean is reached, step 104 opens switch 28 to terminate charging and step 106 measures solar irradiance, most suitably by measuring the output of the PV array 34 in FIG. 1. When the solar output falls to the point Smin at which the value of regulation service exceeds the value of the power produced by the PV array for a period often minutes or so to allow for chance fluctuations in sunlight, step 106 opens switch 42 to disconnect the PV array and closes switch 52 to initiate regulation service.

Step 108 reads the stream of regulation requests every two to four seconds from the ISO. If the request is negative for down regulation, the request is passed to step 110 which ensures that the battery voltage is below V max, a maximum value for regulation and that the pack can accept power from the grid through the off-board charger. Step 110 then permits power to flow to the battery pack, at the rate requested by the proportional control signal from the ISO, for as long as the signal is negative.

When the signal passes through zero and becomes positive for up regulation, step 112 measures battery pack voltage in step 114 to ensure that the pack is above V min, a minimum voltage for regulation and can safely deliver power to the grid. If this condition is satisfied, step 112 permits power to flow to the grid through DC-DC converter 22 and inverter 32 as requested by the proportional signal from the ISO for as long as the signal is positive. When the signal passes through zero, step 116 tests for solar voltage from the PV array, and if none is detected, the cycle repeats, testing for up and down regulation signals and responding appropriately.

It should be noted that the combination of steps 108 and 112 will keep the battery pack roughly centered at V mean, because if the pack drifts too high or too low the DACS will begin to skip down regulation or up regulation cycles until the pack voltage centers. This is a relatively crude method which can be improved upon by utilizing the bias signal provided by the ISO to maintain signal neutrality over time, and additional bias to make up for inefficiency in the charger and converter, but the combination of 108 and 112 will provide a back up to protect the pack in all cases.

Eventually the sun will rise and step 116 will interrupt the regulation process by opening switch 52 to terminate down regulation and closing switch 42 to connect the PV array. Switch 26 is then closed and step 118 tests the battery pack voltage. If it is below Vfull, equivalent to full charge or some other voltage depending on the driver's preference or the cost of power, step 118 continues the charging process through switch 26 and J1772 equipment 64 in FIG. 2 to plug 16 and on board charger 14 in FIG. 1. When the desired voltage is reached, step 118 opens switch 26 and the DACS idles in step 120. When the J1772 plug 16 is disconnected from the vehicle step 120 reinitializes the DACS at 122 to wait for the next operating cycle.

Other Embodiments

Figure 4:
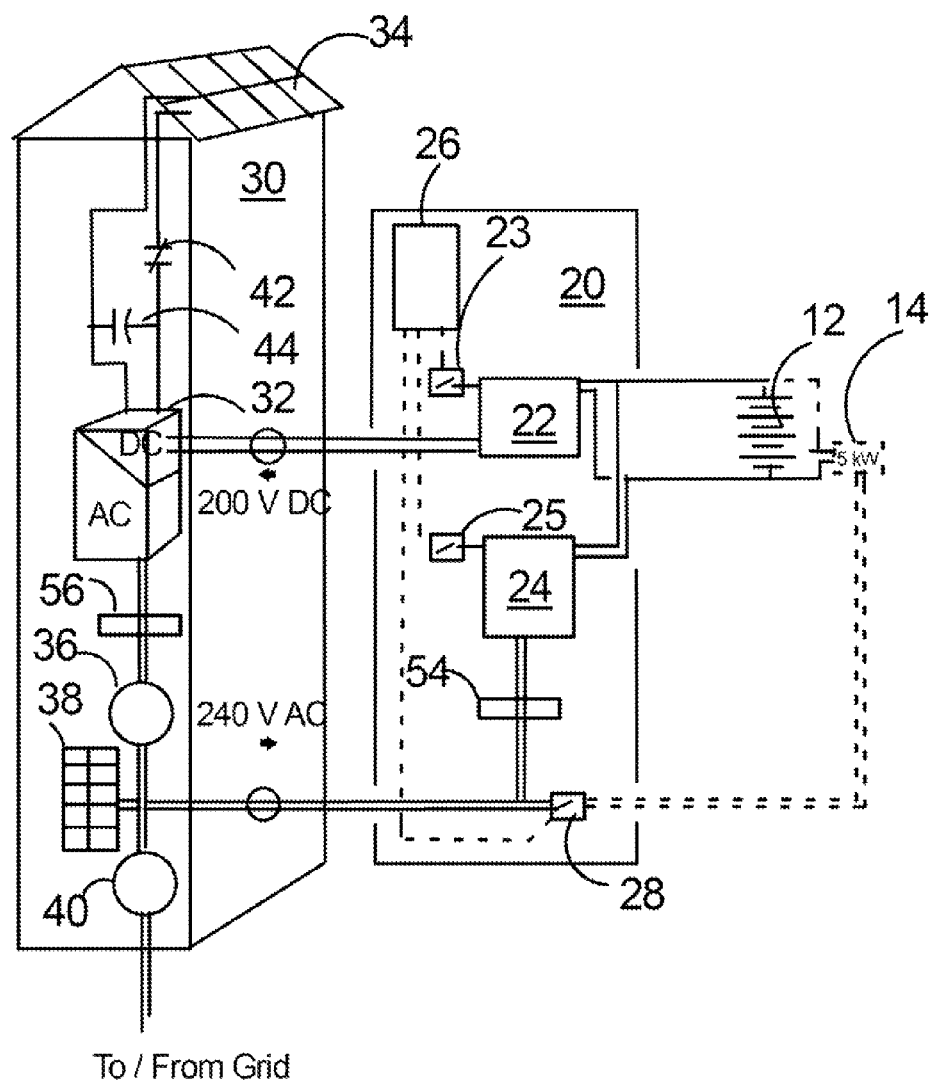
FIG. 4 is a schematic drawing of the apparatus of this invention in which a stationary battery pack is used instead of an electric vehicle.

For owners without an EV, Vehicle 10 may be replaced by a stationary battery 12 permanently wired to EVPV 20 and shown in FIG. 4. The battery may have a separate charger 14, but since its only normal function is frequency regulation, it may be maintained at the proper state of charge by biasing the frequency regulation signal. In case of a power failure when the storage battery is required to provide emergency power, it will need to be recharged via charger 24.

Figure 5:
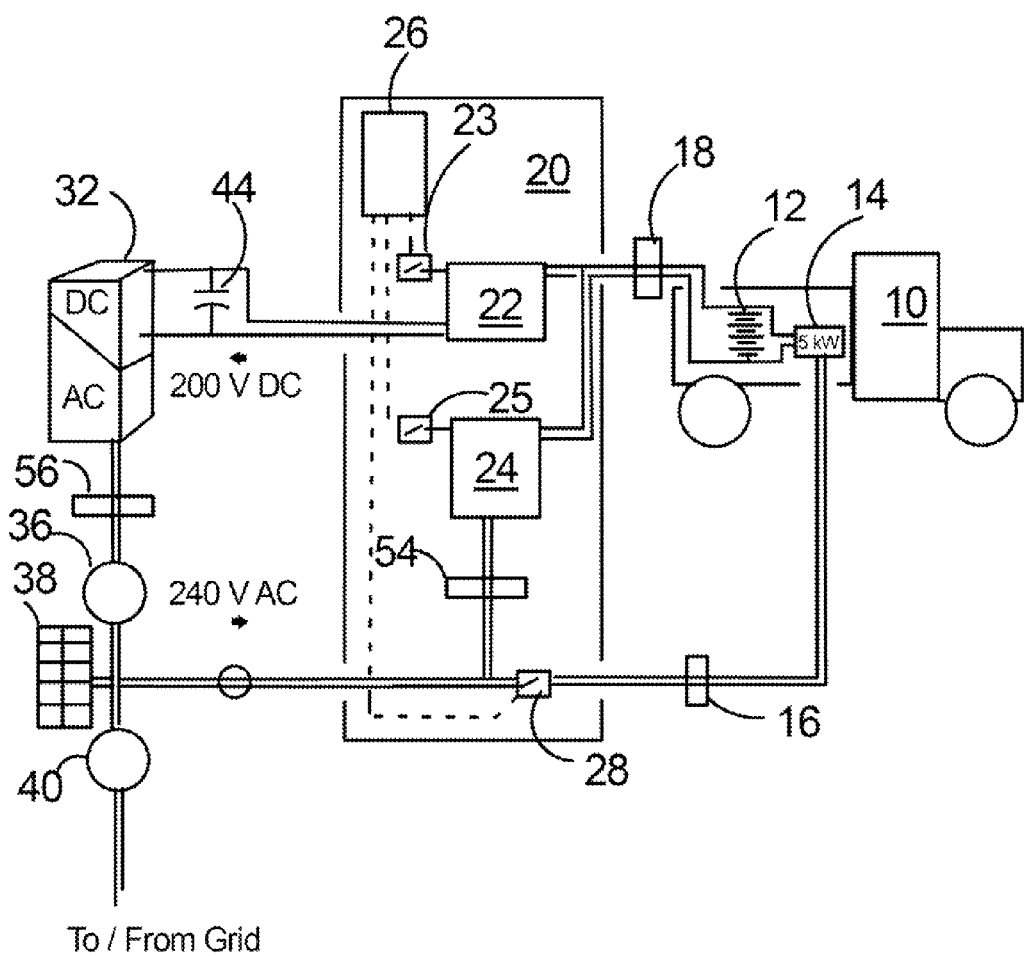
FIG. 5 is a schematic drawing of the apparatus of this invention in which a stand alone inverter is used instead of one which is part of a photovoltaic system.

Similarly, for owners without a PV system, EVPV 20 may be connected to a dedicated grid-tied inverter 32 as shown in FIG. 5. In this case the inverter and its installation cost are added to the cost of the EVPV, but this may be justified by the return to the vehicle owner.

Figure 6:
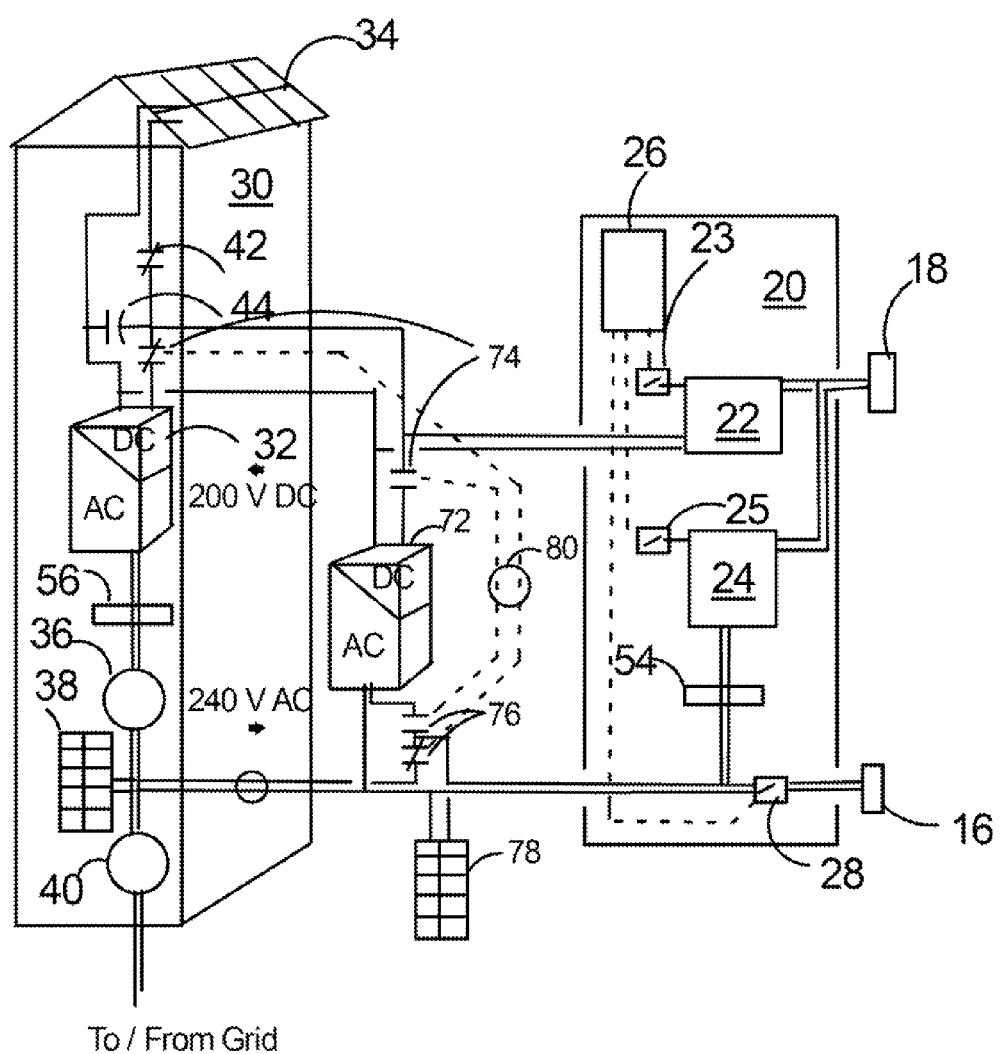
FIG. 6 is a schematic drawing of the apparatus of this invention in which a separate emergency inverter is used to provide power from the PV array and/or a battery pack to critical loads in the event of a power outage

A separate emergency inverter 72 to power critical loads 78 during a power outage is shown in FIG. 6. It should be noted that in this embodiment the PV system is fully operational for powering the loads and recharging the battery pack or vehicle. In the event of an outage switches 74 disengage the PV array and the input capacitor from inverter 32 and connect them to emergency inverter 72. Simultaneously switches 76 which are linked by wiring 80 to switches 74 disconnect the EVPV and the critical load distribution panel 78 from the grid and connect them to emergency inverter 72. In this way during an outage the critical loads such as refrigeration, minimal cooking and emergency lighting are supplied by the sun during the day and by the vehicle battery pack during the night. Any extra PV power can be used to charge the vehicle battery. The EVPV and the J1772 circuit will automatically limit charging to prevent damage to the pack from overcharging during periods of high PV output and low critical load drain. Emergency inverter 72 need not be a grid-tied inverter, since it is never connected to the grid. Low cost uninterruptible power supply inverters are suitable.

It will be understood by those skilled in the art that various combinations of the method and apparatus disclosed herein are possible, and the citation of specific embodiments is not intended to preclude coverage of other possible variants of the basic ideas claimed herewith.

Example 1

An EVPV of this invention has been built and operated successfully. The major components were housed in a NEMA 4 enclosure measuring 30×24×12 inches, which was modified by providing cooling louvers in the sides and the top. DC-DC converter 22 and off board charger 24 were Manzanita Micro PFC-40 battery chargers capable of 40 amps input at 240 V AC or DC. The vehicle battery pack 12 consisted of seventy two 100 Ah lithium-ion cells from China Aeronautical Lithium Battery Co. (CALB). The nominal pack voltage was 230 V. The on board charger 14 was a Manzanita PFC-20. Both on-board and off-board chargers were set to 260 V to charge this pack to a cell voltage of 3.6V. The on-board charger derives power from the 240 V main through a 30 Amp ground fault circuit breaker 60, a DPST Crydom solid state relay 28 and a J1772-compliant EV supply equipment from Modular EV Power.

The dedicated inverter as in FIG. 5 was a Sunny Boy 10,000TL-US from SMA. Its nominal input voltage was 360 V and the DC-DC converter was set to deliver this voltage. A Delta 3.3 kW inverter has also been tested.

During down regulation 240 V AC power is fed through Crydom SPST switches through Dent current transformers on each phase to off-board charger 24, and DC power flows from charger 24 through DC connector 18, a 50 Amp Anderson connector, to battery pack 12. Charger 24 is under control of PIC microcomputer controller 26 running a C program based on the logic shown in FIG. 3. The controller switches charger 24 from manual current control to remote via an internal relay and provides a 0-5 V proportional signal to provide a proportional output current to battery 12.

During up regulation DC power from the battery pack 12 passes to DC-DC converter 22 under control of controller 26. The controller switches converter 22 from manual current control to remote via an internal relay and provides a 0-5 V proportional signal to provide a proportional current output to the inverter 32.

The power in and out of the EVPV 20 is monitored by two Dent Powerscout 3+ meters which measure the voltage at block 50 and the AC current at current transformers 54 for down regulation and 56 for up regulation. The Dent signals pass to PJM, the local Independent System Operator, through a digital switch (not shown separately) via an Ethernet connection running Modbus to "Director" 58. The Director also takes regulation requests from PJM and converts them into inputs to controller 26.

this system has performed satisfactorily both delivering power to an Aerovironment 150 kW battery simulator and to a 48 V battery pack simulating down regulation and from both DC sources through the Sunny Boy transformerless and Delta transformer type inverters to the grid simulating up regulation. The 3.3 kW Delta inverter operated in the MPPT mode. The 10 kW Sunny Boy operated in both the MPPT and in constant voltage mode. This demonstrates the objective of being able to interface virtually any vehicle or other battery pack with any grid-tied inverter.

I claim:

1. A method for enabling an existing main propulsion battery pack of an electric vehicle at any voltage of 100 V or more to provide energy storage and ancillary services such as frequency regulation to the electric grid by connecting the pack to an existing grid-tied Photo Voltaic inverter of virtually any input characteristics via an Electric Vehicle-Photo Voltaic (EVPV) apparatus comprising a DC-DC converter and an off-board battery charger of power substantially equal to that of the DC-DC converter, both of which said DC-DC converter and off-board battery charger are connected to the battery pack by DC wiring, and both of which are subject to control by a Data Acquisition and Control System (DACS) providing either proportional or on-off power flows into or out of the battery pack to the grid, which EVPV apparatus in turn is connected by permanent DC wiring to the grid-tied inverter and by permanent AC wiring to the grid, to provide remotely controllable, bidirectional power flow from the battery pack to the grid enabling ancillary services to be provided to the grid at the request of the grid Independent System Operator (ISO).

2. The method of claim 1 in which requests from the ISO are received and data to the ISO are transmitted via the internet and in which power flows in and out are measured by revenue-grade meters meeting standards required by the ISO.

3. The method of claim 1 in which a number of such geographically distributed battery packs and associated EVPV equipments are aggregated together via internet or grid-enabled communication means to provide adequate proportional response to requests for ancillary service amounting to at least 100 kW and involving power flow in both directions to obtain revenue from the ISO.

4. The method of claim 1 in which the battery pack is in an electric vehicle and is linked to the EVPV via a direct connection to the vehicle battery pack through a DC quick charge port on the vehicle and the electric vehicle on-board charging system is separately provided with AC power to charge the battery via an AC charging port, both connections being made via existing ports supplied with the vehicle.

5. The method of claim 1 in which the battery pack is charged to at least 50% state of charge upon connection to the EVPV after the day's operation of the vehicle enabling frequency regulation to be provided without over or undercharging the battery.

6. The method of claim 1 in which the DACS measures the battery pack voltage to determine its state of charge, and if within pre set limits commands up and down regulation to take place by current flow through the DC-DC converter or the off-board charger, but if not within limits omits either up or down regulation episodes to bring the state of charge within limits.

7. The method of claim 1 in which the EVPV apparatus may be switched to a separate emergency inverter to power critical loads during a power outage.

8. The method of claim 1 in which the input of the grid-tied inverter is switched away from the PV array to the EVPV when the value of the PV power falls below the value of the ancillary service capability of the EVPV, and in which the input of the grid tied inverter is switched away from the EVPV to the PV array when the photovoltaic output rises again to outweigh the value of the ancillary services provided.

9. The method of claim 1 in which the DACS in the morning commands termination of ancillary service and completion of battery recharge to a state specified by the vehicle owner as adequate to the day's operation of the electric vehicle as the top priority.

10. An Electric Vehicle-Photo Voltaic (EVPV) apparatus comprising an off-board battery charger with provision for remote control of the switching power supply current output and a DC-DC converter consisting of another switching power supply battery charger which can take either an AC or DC input and with provision for remote control of the power supply current output and of power substantially equal to that of the first off-board charger, both of which said off-board battery charger and DC-DC converter are connected to a main propulsion battery pack of an electric vehicle with a voltage of at least 100 V by DC wiring, and both of which are subject to control by a Data Acquisition and Control System (DACS) which is capable of receiving commands over the internet to take power from the AC supply or deliver power to an inverter supplying the AC supply and applying those commands to the appropriate remote control of the off-board charger or the DC-DC converter, which EVPV apparatus in turn is connected by permanent DC wiring to a grid-tied inverter and by permanent AC wiring to the grid, to provide remotely controllable ancillary services to the grid at the request of the grid Independent System Operator (ISO).

11. The apparatus of claim 10 in which the off-board charger, the DC-DC converter and the associated control equipment is enclosed in a single EVPV enclosure.

12. The apparatus of claim 10 in which the off-board charger and the DC-DC converter are based on switching power supplies.

13. The apparatus of claim 10 in which the EVPV is connected to the battery in an electric vehicle by means that include an SAE J1772 standard AC battery charging cord set connected to an on-board battery charger and a separate DC cord set matching the DC quick charge receptacle on the vehicle connected direct to the Battery pack such as the CHaDEMO standard used in Japan.

14. The apparatus of claim 10 in which the cord set complies with the SAE 1772 specification for DC quick charging level 1 transmitting both AC and DC power over the same conductors with appropriate switches in the EVPV to perform either AC battery charging or DC ancillary services.

15. The apparatus of claim 10 in which the cord sets include an SAE J1772 standard AC battery charging cord set which is connected to an on-board battery charger and a separate DC cord set matching the DC quick charge receptacle on the vehicle connected direct to the battery pack and in which both these functions may be performed by the SAE CCS "combo" plug and receptacle.

16. The apparatus of claim 10 in which the cord set and the associated Electric Vehicle charging control equipment is adapted to charge and discharge battery packs in vehicles with special non standard interfaces such as the Tesla model S.

17. The apparatus of claim 10 in which the power flow to and from the EVPV is monitored by power metering equipment and the results are returned to the ISO by a communication device.

18. The apparatus of claim 10 in which the DC-DC converter and the off-board charger are provided with means to respond to proportional requests for output and input AC power.

* * * * *